United States Patent [19]

Iino et al.

[11] Patent Number: 5,172,312

[45] Date of Patent: Dec. 15, 1992

[54] CONTROL SYSTEM AND METHOD FOR DETERMINING CONTROL PARAMETERS OF PLANTS

[75] Inventors: Yutaka Iino, Kawasaki; Takashi Shigemasa, Yokohama, both of Japan

[73] Assignee: Kabushiki Kaisha Toshiba, Kawasaki, Japan

[21] Appl. No.: 461,737

[22] Filed: Jan. 8, 1990

[30] Foreign Application Priority Data

Jan. 20, 1989 [JP] Japan ..................................... 1-9682

[51] Int. Cl.$^5$ ....................... G05B 13/04; G05B 13/02
[52] U.S. Cl. ..................................... 364/149; 364/160; 364/157; 364/148
[58] Field of Search ............................... 364/148-151, 364/166, 178, 157, 159-163; 318/561, 567, 607-610

[56] References Cited

U.S. PATENT DOCUMENTS

| | | | |
|---|---|---|---|
| 4,479,176 | 10/1984 | Grimshaw | 364/148 |
| 4,609,855 | 9/1986 | Andrews | 364/157 |
| 4,754,391 | 6/1988 | Suzuki | 364/157 |
| 4,852,053 | 7/1989 | Turrie | 364/157 |
| 4,855,674 | 8/1989 | Murate et al. | 364/157 |
| 4,881,160 | 11/1989 | Sakai et al. | 364/157 |
| 4,882,526 | 11/1989 | Iino et al. | 364/150 |
| 4,922,412 | 5/1990 | Lane et al. | 364/157 |
| 4,983,898 | 1/1991 | Kanda | 364/150 |

FOREIGN PATENT DOCUMENTS

3618025  3/1987  Fed. Rep. of Germany .

OTHER PUBLICATIONS

S. J. Zitek et al., "Instruments & Control Systems", vol. 48, No. 9, Sep. 1975, pp. 31-36.
G. J. Blickley, "Control Engineering", vol. 35, No. 11, Nov. 1988, p. 99.
Akizuki et al., "System Identification," Standard Book published by Society of Instrument and Control Engineers of Japan, Feb. 10, 1989, chapter 3, pp. 50-74.
Kitamori, "A Method of Control System Design Based Upon Partial Knowledge About Controlled Processes," Transaction on Society of Instrument and Control Engineers of Japan, vol. 15, 1979, pp. 549-555.

Primary Examiner—Jerry Smith
Assistant Examiner—Jim Trammell
Attorney, Agent, or Firm—Foley & Lardner

[57] ABSTRACT

A control system frequency response curve forming device for forming an comprising an original frequency response curve of an object to be controlled according to the dynamic characteristic data of the object; a model selector for selecting one of transfer function models which are low degree transfer functions prepared in advance to the original frequency response curve of the objects; an approximate curve moving device for moving an approximate curve corresponding to the selected model transfer function toward and away in order to fit the original frequency response curve and fixing a position of the approximate curve; a parameter deciding device for deciding parameters of the selected model transfer function according to the fixed position of the approximate curve; a selector for selecting one of control parameters deciding algorithms; and a control parameters deciding device for deciding the control parameters based on the selected model transfer function and according to the selected control deciding algorithm.

10 Claims, 9 Drawing Sheets

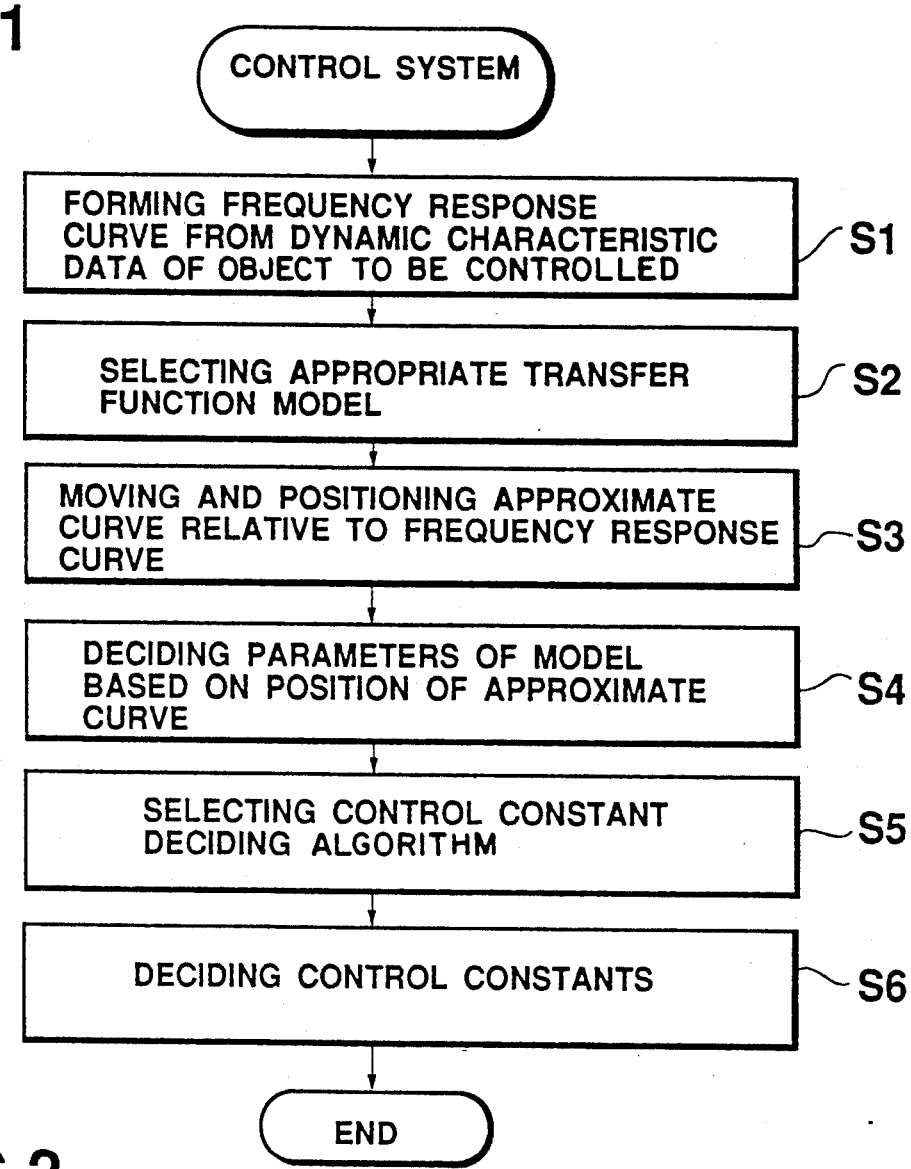
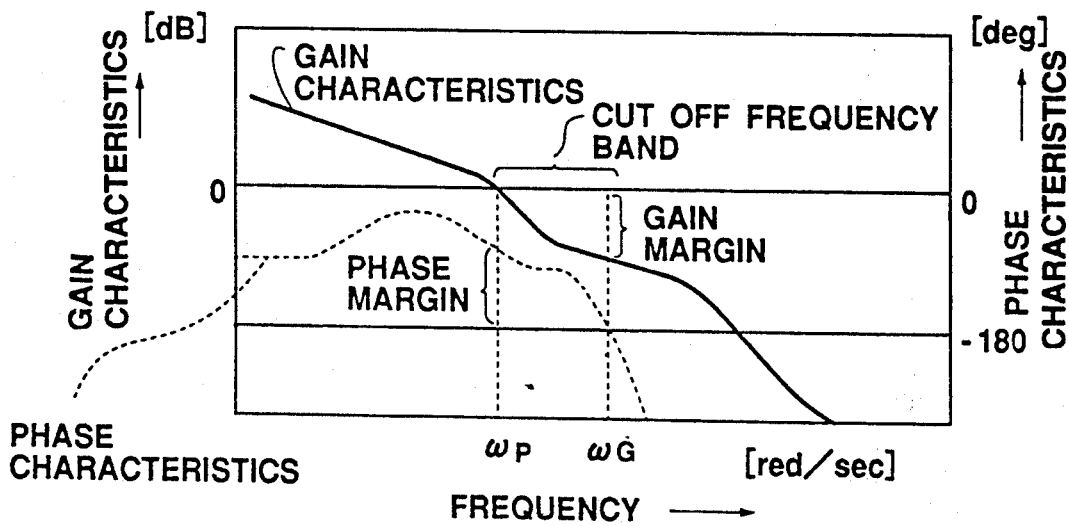

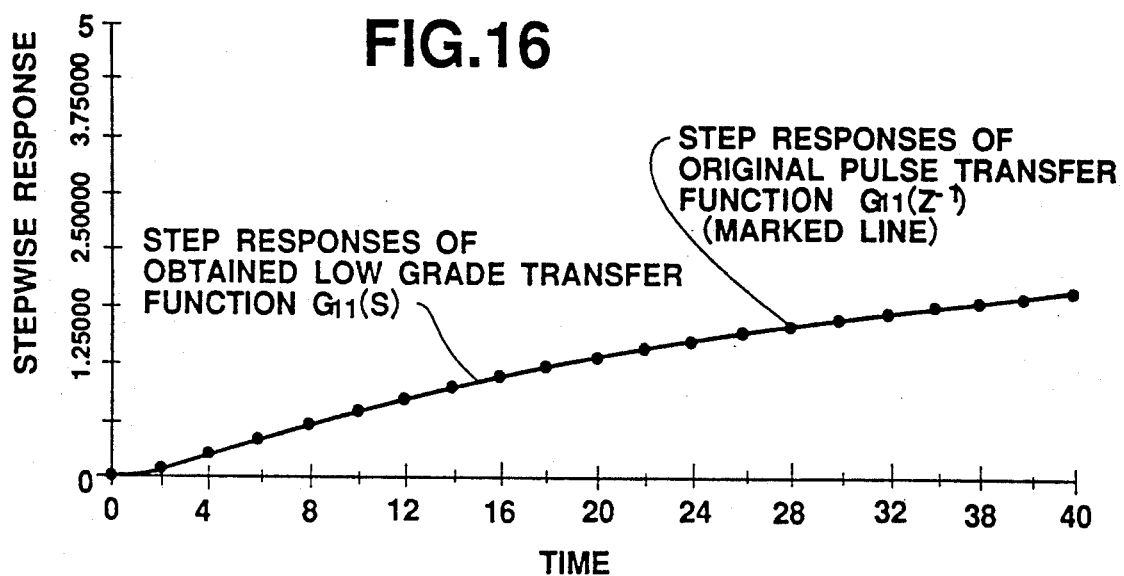
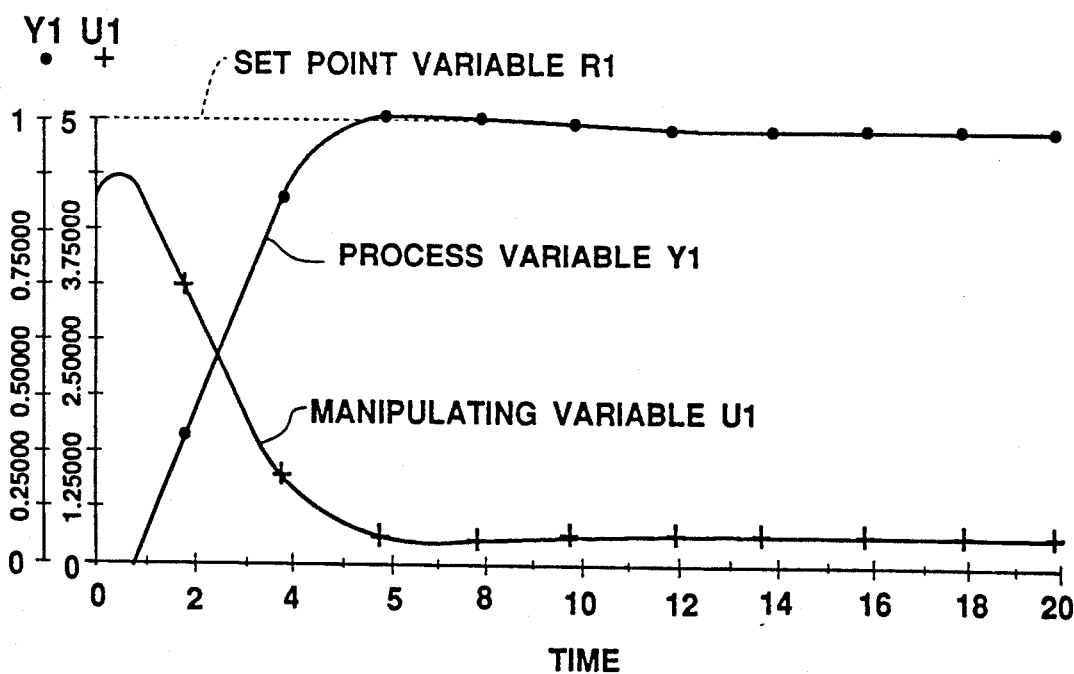

FIG.18 (a)
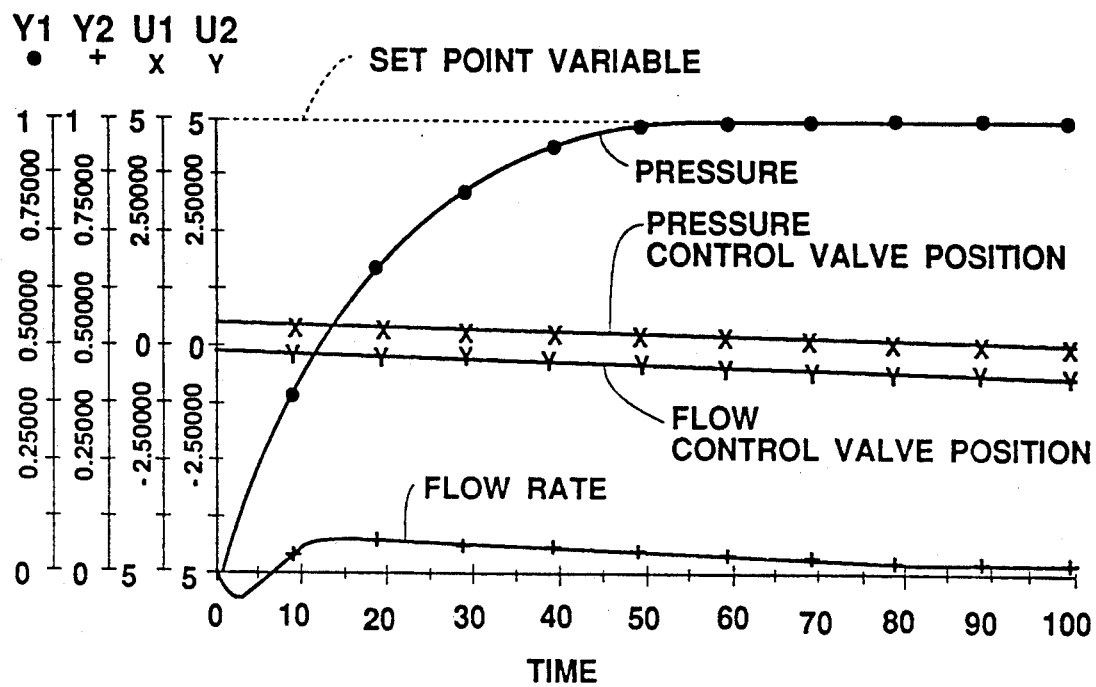
FUG.18 (b)
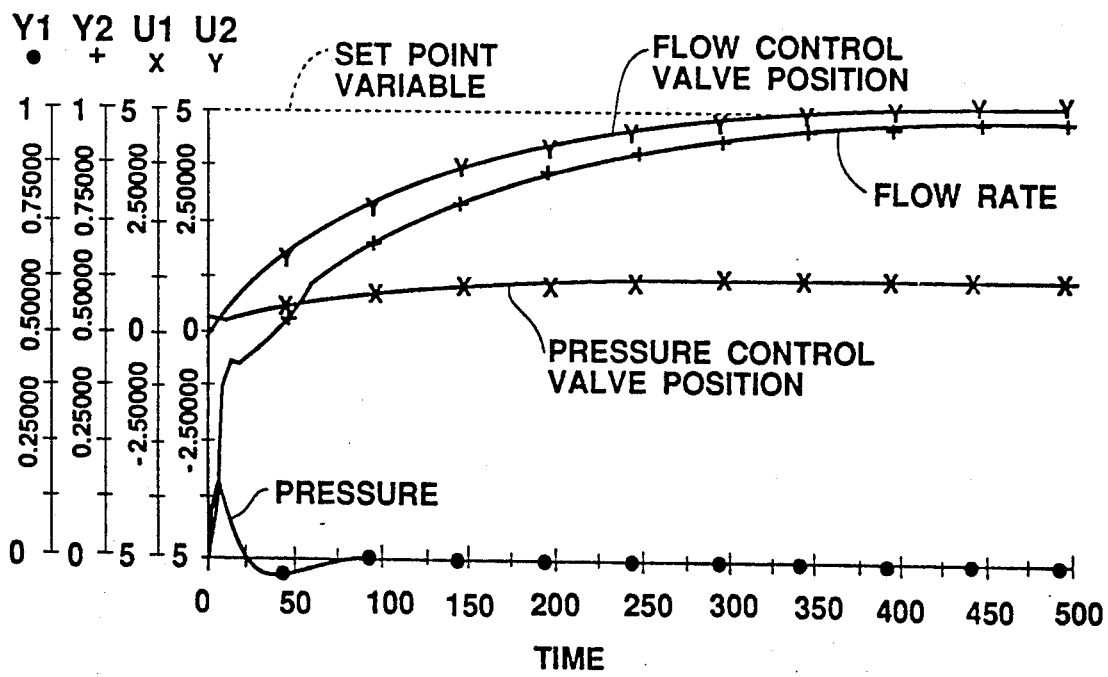

CONTROL SYSTEM AND METHOD FOR DETERMINING CONTROL PARAMETERS OF PLANTS

BACKGROUND OF THE INVENTION

1. Field of the Invention

The present invention relates to a control and a method for determining system control parameters of an effect to be controlled in industrial processes, plants and mechanical systems. Particularly, the present invention relates to a control system rising desired algorithms for determining the control parameters of the object easily, quickly and reliably.

2. Description of the Prior Art

For control systems employed in various industrial plants and mechanical systems such as manipulators, it is essential to properly determine their control parameters such as PID controller's constants so that objects to be controlled may provide desired responses.

To determine the control parameters of the plants and the like computer aided control systems have been developed. The computer aided control systems are designed to readily handle various kinds of algorithms.

In the computer aided control system, a mathematical model, i.e., a transfer function is needed to express the dynamic characteristics of the to be controlled object. To obtain the transfer function, several algorithms are known.

One of these algorithms expresses the dynamic characteristics of the object with differential equations according to the physical structure of the object and obtains the transfer function by linear approximation.

Another one inputs a test signal to the object, to obtain a response signal. Based on the input and response signal, a time series model, i.e., a pulse transfer function is obtained, according to the least square method.

A further one inputs a sinusoid wave signal to the object. Based on the amplitude ratio and phase difference of the sinusoid wave signal and the basic wave component of an output signal, a frequency response curve of the object is obtained. (For example, a scientific journal, "System Identification" by Akizuki, Katayama, Sagara and Nakamizo, published by the Society of Instrument and Control Engineers (SICE), in Japan, in 1981.

To determine the control parameters of the plants and the like, the following algorithms are well known:

(1) Ziegler-Nichols method by J. G. Ziegler and N. B. Nichols, disclosed in "Optimum Settings for Automatic Controllers," Trans., ASME, Vol. 64 (1942), pp. 759 to 768;

(2) CHR method by Kun Li Chien, J. A. Hrones and J. B. Reswick, disclosed in "On the Automatic Control of Generalized Passive Systems," Trans., ASME, Vol. 74 (1952), pp. 175 to 185; and (3) Partial model matching method by Kitamori, disclosed in "A method of control system design based upon partial knowledge about controlled processes" Trans. Society of Instrument and Control Engineers, theses Vol. 15 (1979), No. 4, pp. 549 to 555 in Japanese.

To determine the control parameters according to conventional PID (Proportional Integral Derivative) control that is widely employed in an industrial field, the partial model matching method is also effective as the Ziegler-Nichols and CHR methods. In addition, the partial model matching method is advantageous because it is easily adaptable to a decoupling PID control for a multiple-input-output process (Kitamori: "A Design Method for I-PD Type Decoupled Control Systems Based upon Partial Knowledge about Controlled Processes" Trans. Society of Instruments and Control Engineers) and a sampled value control (Kitamori: "A Design Method for Sampled Data Control Systems Based upon Partial Knowledge about Controlled Process" Trans. Society of Instruments and Control Engineers, Vol 15, No. 5 pp. 695-700 (1979).

However, in the actual control system, a continuous-time dynamic characteristic model, i.e., a transfer function of the controlled object is needed. In addition, the type of the transfer function is limited by the algorithms to be selected. For example, for the Ziegler-Nichols method, the transfer function has the following form:

$$G(S)=(K/S)e^{-LS} \quad (1)$$

where S is the Laplace Operator.

For the CHR method, the transfer function has the following form:

$$G(S)=(K/(1+TS))e^{-LS} \quad (2)$$

The partial model matching method is applicable to the following types of transfer functions:

$$G(S)=B(S)/A(S)$$

$$A(S)=a_0+a_1S+a_2S^2+\ldots+a_nS^n$$

$$B(S)=b_0+b_1S+\ldots+b_mS^m \quad (3)$$

However, if a transfer function has a zero point, such as in an overshoot system, or if the transfer function has complex poles, namely, oscillatory direct response application of the partial model matching method may result in providing control parameters which makes the control system unstable in operation.

In obtaining a transfer function according to the algorithms previously explained, it is not certain whether or not the obtained transfer function has a form suitable for the control system. For example, a transfer function obtainable from the physical structure of the object to be controlled is generally of high degree. A time series model estimated by the least square method, i.e., a pulse transfer function, is not directly applicable to the control systems. A frequency response curve measured as to the object is not directly applicable to the control system.

Therefore, to apply the transfer functions to the control system, each of the transfer functions shall be converted into a continuous-time transfer function and then converted into a simple form, such as the form of equation (1) or (2). Namely, there is a need to provide means to reduce the degree of the transfer function.

To reduce the degree of the transfer function, various algorithms have been proposed. For example, "Automatic Control Handbook (Basics)" edited by Society of Instrument and Control Engineers in 1983, pp. 85 to 89 may be referred to. However, it is not clear which of the algorithms is most effective in the control system.

SUMMARY OF THE INVENTION

An object of the present invention is to solve these problems of the conventional control system.

In order to accomplish the above object of the present invention, the control system according to the present invention is arranged as shown in FIG. 1. In the figure, a method of the present invention comprises the steps of S1 for forming a frequency response curve of an object to be controlled according to inputted dynamic characteristic data (of the object) that may take a form of continuous-time transfer function, pulse transfer function, frequency response data or input/output signal data; S2 for selecting an optional model transfer function among a plurality of model transfer functions that are low degree transfer functions prepared in advance to express frequency response curves respectively; S3 for moving an approximate curve that represents the selected model transfer function toward and away from the frequency response curve of the object and fixing the approximate curve at an optional position; S4 for deciding parameters of the selected model transfer function according to the fixed position of the approximate curve; S5 for selecting optional one of a plurality of control parameter deciding algorithms that have been prepared in advance to decide control parameters according to the model transfer function whose parameters have been decided in the previous process; and S6 for deciding the control parameters based on the model transfer function whose parameters have been decided, and according to the control parameters deciding algorithms selected in the step S5.

A control apparatus of the present invention comprises means for executing the method of the present invention shown in FIG. 1. The apparatus of the present invention comprises: frequency response curve forming means for forming a frequency response curve of an object to be controlled according to inputted dynamic characteristic data (of the object) that may take a proper form of continuous-time transfer function, pulse transfer function, frequency response data or input/output signal data of the controlled object; model selecting means for selecting an optional model among a plurality of model transfer functions that are low degree transfer functions prepared in advance to express frequency response curves respectively; approximate curve moving means for moving an approximate curve representing the selected model transfer function toward and away from the frequency response curve of the controlled object prepared by the frequency response curve forming means and fitting the approximate curve at an optional position; parameter deciding means for deciding parameters of the model transfer function selected by the model selecting means, according to the fixed position of the approximate curve; control parameter deciding method selecting means for selecting an optional one among a plurality of control parameter deciding algorithms that have been prepared in advance to decide a controller parameter based on the model transfer function whose parameters have been decided by the parameter deciding means; and control parameter deciding means for deciding the controller parameter based on the model transfer function whose parameters have been decided by the parameter deciding means, and according to the control parameter deciding method selected by the control constant deciding algorithms selecting means.

According to the method of the present invention, the dynamic characteristic data of proper form of the object is inputted, and, based on the data, a frequency response curve of the controlled object is formed. An appropriate model is selected among the models of low degree transfer functions that have been prepared in advance. An approximate curve representing the selected model is moved toward and away from the frequency response curve and fixed at a desired position. Based on the fixed position, parameters of the model are decided.

After that, an optional algorithm is selected among the control constant deciding algorithms that have been prepared in advance. By using the selected algorithm and based on the model transfer function, the control parameter are decided.

With gain K, time constant T, oscillation characteristic parameters $\xi$ and $\omega$ and dead time L, the following model transfer functions may be prepared:

$$G_1(S) = (K/L)e^{-LS} \tag{4}$$

$$G_2(S) = (K/(1+TS))e^{-LS} \tag{5}$$

$$G_3(S) = (\omega^2 K/(\omega^2 + 2\xi\omega S + S^2))e^{-LS} \tag{6}$$

As the control constant deciding algorithms, the Ziegler-Nichols method, CHR method and partial model matching method are employed. In the step S3, an approximate curve representing a selected model transfer function is fitted at an appropriate position with respect to a frequency response curve of the object formed in the step S1. As a result, parameters such as K, T, L, $\xi$ and $\omega$ and control parameter such as a proportional gain KP, an integral time TI and a derivative time TD can be decided easily and quickly.

As shown in FIG. 2, to keep stability that is essential for the control system, a stability margin (gain margin and phase margin) shall be reserved. The stability margin is determined by the characteristics of a cut off frequency band, namely an intermediate frequency band in the range of frequencies $\omega p$ and $\omega g$ on the frequency response curve of a loop transfer function from control deviation variable to control variable. Therefore, it is very important in stabilizing the control system to employ a transfer function that correctly represents the characteristics of the cut off frequency band of the object being controlled.

According to the present invention, an approximate line is fitted to the cut off frequency band of a frequency response curve of the object that shall be correct. Therefore, even when the object to be controlled has specific frequency characteristics which are very difficult in determination in the conventional algorithms, it is possible to easily, satisfactorily and reliably stabilize the control system such as PID control system, decoupling PID control system, etc.

These and other objects, features and advantages of the present invention will be more apparent from the following detailed description of preferred embodiments in conjunction with the accompanying drawings.

BRIEF DESCRIPTION OF THE DRAWINGS

FIG. 1 is a flowchart of the control system of the present invention;

FIG. 2 is an explanatory view showing operation of the system of the present invention;

FIG. 16 is an explanatory view comparing stepwise responses of an obtained low degree transfer function and of a pulse transfer function;

FIG. 17 is a view showing a pressure set point variable pursuing response curve of a PID control system according to the CHR method with the obtained low degree transfer function; and FIGS. 18(a) and 18(b) are views showing set point variable pursuing response curves of pressures and flow rates of a decoupling PID control system according to the partial model matching method by obtaining a two-input two-output transfer function matrix.

DETAILED DESCRIPTION OF THE EMBODIMENTS

Figure 3:
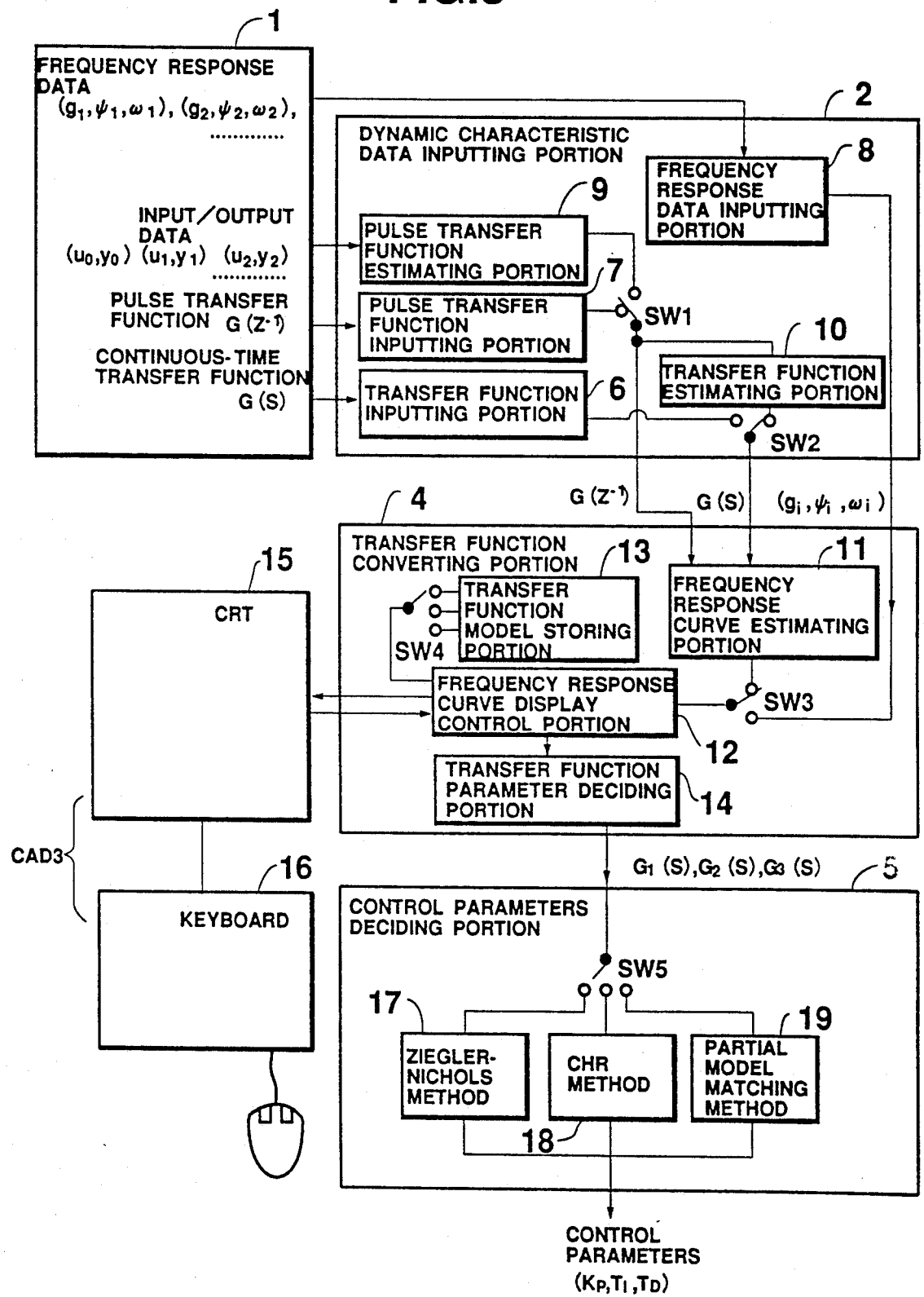
FIG. 3 is a block diagram of an embodiment of the present invention.

FIG. 3 shows an embodiment of a control system of the present invention, which system comprises: a dynamic characteristic data inputting portion 2 for receiving the dynamic characteristic data of an object 1 (to be controlled) directly or indirectly from a measuring portion a transfer function converting portion 4 for obtaining a low degree continuous-time transfer function according to the inputted dynamic characteristic data and given operation of a CAD 3; and a control constant deciding portion 5 for deciding controller parameter based on the obtained low degree continuous-time transfer function and according to a selected control constant deciding algorithm.

The dynamic characteristic data inputting portion 2 for receiving the dynamic characteristic data of the object to be controlled comprises: a transfer function inputting portion 6; a pulse transfer function inputting portion 7; a frequency response data inputting portion 8; and a pulse transfer function estimating portion 9 for receiving input and output data to estimate a pulse transfer function.

The transfer function inputting portion 6 issues a continuous-time transfer function G(S) expressed by the following equations:

$$G(S) = (B(S)/A(S))e^{-LS}$$

$$A(S) = a_0 + a_1 S + \ldots a_n S^n$$

$$B(S) = b_0 + b_1 S + \ldots b_m S^m \quad (7)$$

The pulse transfer function inputting portion 7 issues a pulse transfer function $G(Z^{-1})$ expressed with the following equations:

$$G(Z^{-1}) = Q(Z^{-1})/P(Z^{-1})$$

$$P(Z^{-1}) = p_0 + p_1 Z^{-1} + \ldots + p_n Z^{-n}$$

$$Q(Z^{-1}) = q_0 + q_1 Z^{-1} + \ldots + q_m Z^{-m} \quad (8)$$

The frequency response data inputting portion 8 issues a data sequence expressed by the following equation related to a frequency response curve of the object 1, with gains $g_i$, phases $\psi_i$ and frequencies $\omega_i$:

$$\{(g_1,\psi_1,\omega_1),(g_2,\psi_2,\omega_2),\ldots,(g_N,\psi_N,\omega_N)\}$$

The pulse transfer function estimating portion 9 receives input/output signals of the object 1 in the following equation, with input signals $u^i$ and output signals $y_i$:

$$\{(u_0,y_0),(u_1,y_1),\ldots,(u_N,y_N)\}$$

Then, the pulse transfer function estimating portion 9 finds the pulse transfer function $G(Z^{-1})$ expressed with the equation (8) according to the least square method (refer to a scientific journal book titled "System Identification" of the Society of Instrument and Control Engineers (SICE) in Japan.

The dynamic characteristic data inputting portion 2 further comprises: a transfer function estimating portion 10 for converting the inputted pulse transfer function $G(Z^{-1})$ into a continuous-time transfer function G(S) expressed with the equation (7) according to a Z-S converting method (refer to Mita, et. al.: "Problems on conversion of multivariable discrete time systems into continuous systems", Inst. Electrical Engineers, Japan, Vol 104, No. 11, pp. 273 in Japanese in 1984" by Mita and Umezu, of Electric 280 in Japanese); a switch SW1 for switching an output of the pulse transfer function inputting portion 7 and an output of the pulse transfer function estimating portion 9 from one to the other to provide the output to the transfer function estimating portion 10 as well as providing the output directly to the transfer function converting portion 4; and a switch SW2 for outputting one of outputs of the transfer function estimating portion 10 and transfer function inputting portion 6 to the transfer function converting portion 4.

In this way, the dynamic characteristic data of the object, inputted to the dynamic characteristic data inputting portion 2 is transferred in the form of frequency response data ($g_i$, $\psi_i$, $\omega_i$), continuous-time transfer function G(S) or pulse transfer function $G(Z^{-1})$ to the transfer function converting portion 4.

The transfer function converting portion 4 comprises a frequency response curve estimating portion 11 that finds a frequency response curve of the object 1 according to the following equations (9) to (12), when the inputted dynamic characteristic data is the continuous-time transfer function G(S) or pulse transfer function:

$$G(j\omega) = G(S)|_{s=j\omega} \text{ (for the continuous-time transfer function)} \quad (9)$$

$$G(j\omega) = G(Z^{-1})|_{z=e^{j\omega T}} \text{ (for the discrete-time transfer function)} \quad (10)$$

where is an angular frequency, j an imaginary unit and a sampling period.

$$\text{Gain characteristic } |G(j\omega)| = \sqrt{X(\omega)^2 + Y(\omega)^2} \quad (11)$$

$$\text{Phase characteristics } < G(j\omega) = \tan^{-1}(Y(\omega)/X(\omega)) \quad (12)$$

$$(X(\omega) = Re\{G(j\omega)\},\ Y(\omega) = Im\{G(j\omega)\})$$

The transfer function converting portion 4 further comprises: a switch SW3 for switching frequency response data from the frequency response curve estimating portion 11 and frequency response data inputting portion 8 from one to the other; a frequency response curve display controlling portion 12 for receiving an output of the switch SW3; a transfer function model storing portion 13 connected to the display controlling portion 12; a transfer function parameter deciding portion 14 also connected to the display controlling portion 12; and a switch 4 for selecting model transfer functions.

The transfer function model storing portion 13 stores approximate curves (straight lines in this embodiment) representing frequency response curves of model transfer functions expressed by the equations (4), (5), and (6).

The frequency response curve display controlling portion 12 displays the frequency response curve or frequency response data inputted through the switch SW3 on a screen of a CRT 15 of the CAD 3. At the same time, the display controlling portion 12 displays an approximate curve of a model transfer function selected by the switch SW4 from the transfer function model storing portion 13, on the CRT 15.

The transfer function parameter deciding portion 14 positions the approximate curve of the model transfer function displayed on the CRT according to operations of a keyboard 16 and a mouse 17 of the CAD 3 as described later. Then, the transfer function parameter deciding portion 14 decides parameters of the model transfer function based on the position of the approximate curve. Operation of the CAD 3 will be explained later with reference to FIG. 3 and the following figures.

The control constant deciding portion 5 receives the model transfer function from the transfer function parameter deciding portion 14, and provides the same through a switch SW 5 to a Ziegler-Nichols method operating portion 17, CHR method operating portion 18 or partial model matching method operating portion 19. The operating portions 17, 18 and 19 decide the control parameter (KP, TI and TD).

Operation of the control system of the present invention will be now explained.

First, the dynamic characteristic data inputting portion 2 receives input and output response data, frequency response curve data, pulse transfer function data or continuous-time transfer function data of the object 1 to be controlled.

If it is the input and output response data, the pulse transfer function estimating portion 9 estimates a time series model, i.e., a pulse transfer function according to the least square method. The estimated pulse transfer function is converted into a continuous-time transfer function by the transfer function estimating portion 10 according to the Z-S converting method.

In this way, a pulse transfer function $G(Z^{-1})$, continuous-time transfer function $G(S)$ or frequency response data $\{g_i, \psi_i, \omega_i\}(i=1, 2, \ldots, N)$ is sent to the transfer function converting portion 4.

Figure 4:
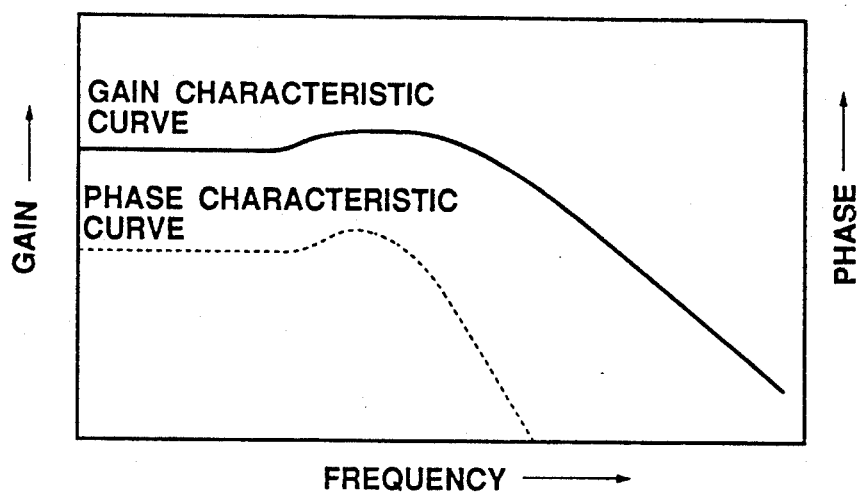
FIGS. 4 to 12 are explanatory views showing frequency response curves displayed on a screen of a CRT terminal.

The transfer function converting portion 4 converts the pulse transfer function $G(Z^{-1})$ or the continuous-time transfer function $G(S)$ into a frequency response function $G(j\omega)$ ($\omega$ being an angular frequency) according to the equations (9) to (12) to display frequency response curves, i.e., a gain characteristic curve and a phase characteristic curve, on the screen of the CRT 15 as shown in FIG. 4.

Meanwhile, an operator manipulates the switch SW4 to select a low degree transfer function model of type I, II or III expressed by the equation (4), (5) or (6).

Figure 5:
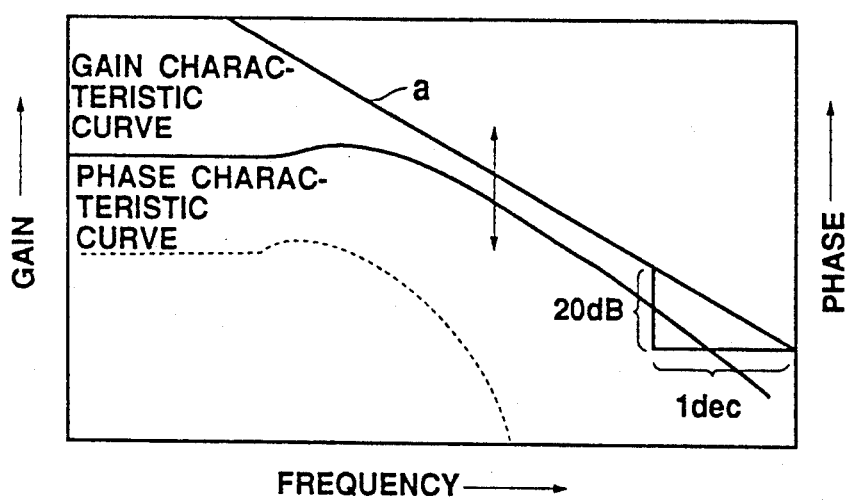

If the type I is selected, a straight line a is displayed with the frequency response curves as shown in FIG. 5. The straight line a corresponds to gain characteristics of the model transfer function and is inclining by $-20$ dB/dec. The straight line a can be moved vertically by manipulating a mouse connected to the keyboard 16. The straight line a is adjusted to a proper position relative to the gain characteristic curve. Then, a button of the mouse is clicked to read a gain $|G(j\omega_0)|$ [dB] for a certain frequency $\omega_0$ at the moment. Then, the transfer function parameter deciding portion 14 decides the parameter K of the equation (4) as follows:

$$K = \omega_0 10^{|G(j\omega_0)|/20} \tag{13}$$

Figure 6:
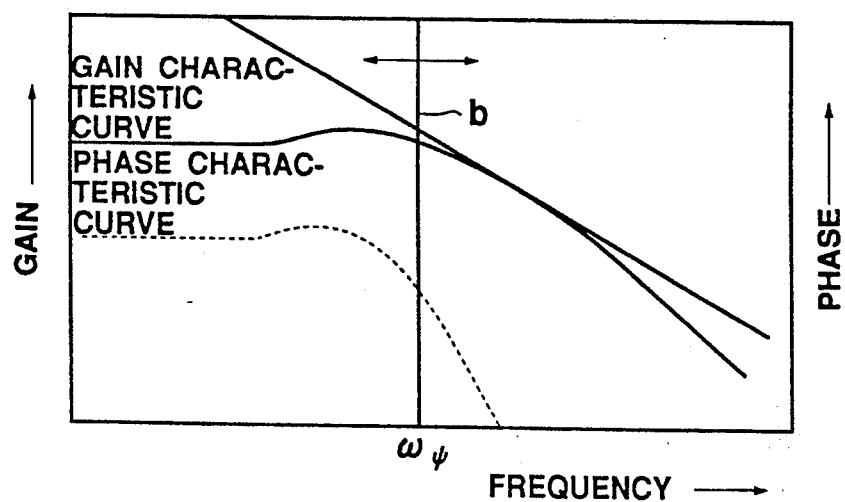

After that, a vertical straight line b is displayed as shown in FIG. 6. The straight line b represents a certain frequency $\omega_\psi$ corresponding to frequency characteristics of the model transfer function. The straight line b can be moved left and right by operating the mouse. The straight line b is adjusted to a desired frequency on the phase characteristic curve, and the button of the mouse is clicked to read the frequency $\omega_\psi$ and a phase $<G(j\omega_\psi)$ [rad/sec] at the moment. Then, the transfer function parameter deciding portion 14 decides the parameter L of the equation (4) as follows:

$$L = ((-<G(j\omega_\psi) - (\pi/2))/(\omega_\psi) \tag{14}$$

(if $L<0$ then $L=0$)

In this way, the embodiment approximates several straight lines or curves to the gain characteristic curve among the frequency response curves of the object 1. Based on positions of the straight lines or curves, a transfer function of minimum phase system that approximates only to the gain characteristics of the object 1 is calculated. Based on a difference between a phase characteristic curve calculated from the transfer function of minimum phase system and the original phase characteristic curve of the object 1, a non-minimum phase component, i.e., a dead time element $e^{-LS}$ or an all-pass filter element is calculated as follows:

$$\left( \prod_{i=1}^{n} (1 - a_i S) \right) / \left( \prod_{i=1}^{n} ((1(1 + a_i S)) \right)$$

The transfer function of minimum phase system and the non-minimum phase component are combined to provide a transfer function from which controller parameter are calculated.

Figure 7:
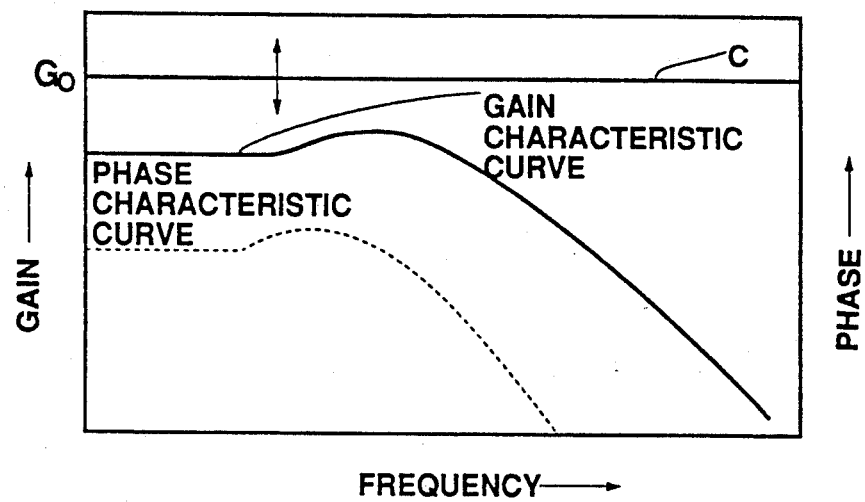

If the type II is selected, a horizontal straight line c is displayed with the frequency response curves as shown in FIG. 7. The straight line c can be moved vertically by operating the mouse. The straight line c is adjusted to a proper position relative to the gain characteristic curve, and the button of the mouse is clicked to read a gain $G_0$[dB] at the moment. Then, the transfer function parameter deciding portion 14 decides the parameter K of the equation (5) as follows:

$$K = 10^{G_0/20} \tag{15}$$

Figure 8:
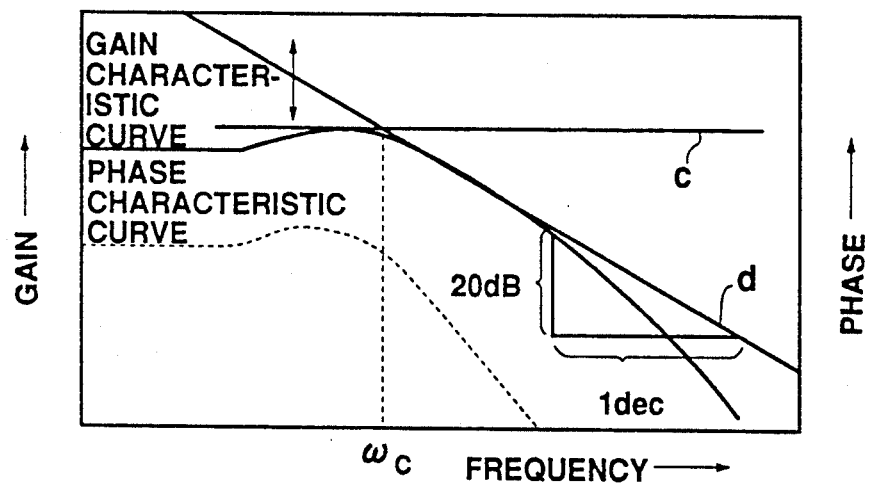

After that, a straight line d inclined by $-20$ dB/dec is displayed with the frequency response curves as shown in FIG. 8. The straight line d can be moved vertically by operating the mouse. The straight line d is adjusted to a proper position relative to the gain characteristic curve, and the button of the mouse is clicked to read an intersection frequency $\omega_c$[rad/sec]. Then, the transfer function parameter deciding portion 14 decides the parameter T of the equation (5) as follows:

$$T = 1/\omega_c \tag{16}$$

The straight lines c and d represent the gain characteristics of the model transfer function.

Figure 9:
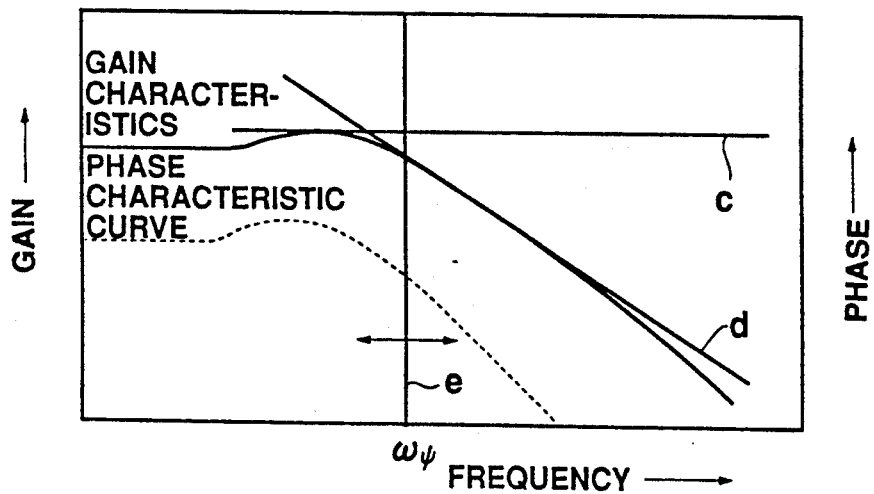

After that, a vertical straight line e representing a certain frequency $\omega_\psi$ is displayed as shown in FIG. 9. The straight line e can be moved left and right by operating the mouse. The straight line e is adjusted to a required frequency on the phase characteristic curve, and the button of the mouse is clicked to read the frequency $\omega_\psi$ and a phase $<G(j\omega_\psi)$ [rad/sec]. Then, the transfer function parameter deciding portion 14 decides the parameter L of the equation (5) as follows:

$$L = (-<G(j\omega_\psi) - \tan^{-1}(T\omega_\psi))/(\omega_\psi) \quad (17)$$

(if L<0 then L=0)

Figure 10:
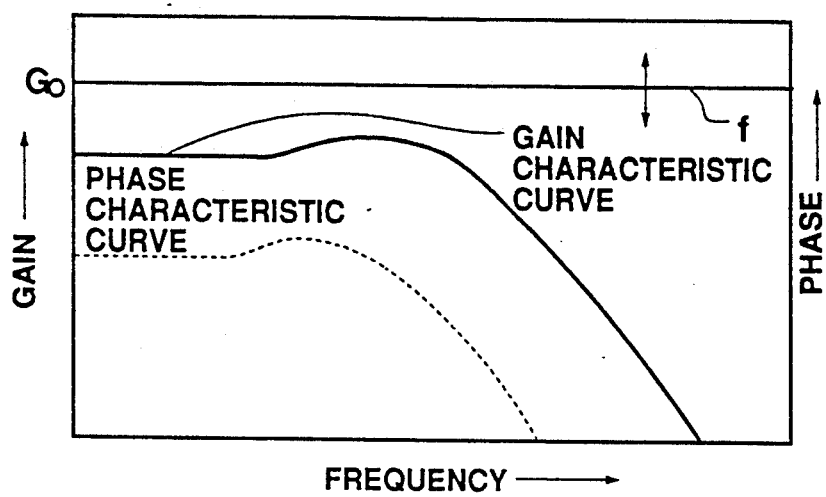

If the type III is selected, a horizontal straight line f is displayed with the frequency response curves as shown in FIG. 10. The straight line f can be moved vertically by manipulating the mouse. The straight line f is adjusted to a proper position relative to the gain characteristic curve, and the button of the mouse is clicked to read a gain $G_0$[dB] at the moment. Then, the transfer function parameter deciding portion 14 decides the parameter K of the equation (6) as follows:

$$K = 10^{G_0/20} \quad (18)$$

Figure 11:
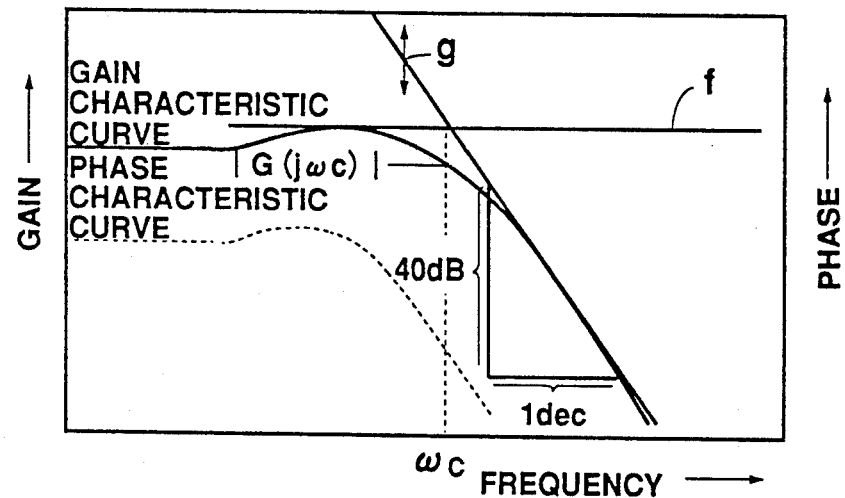
Figure 12:
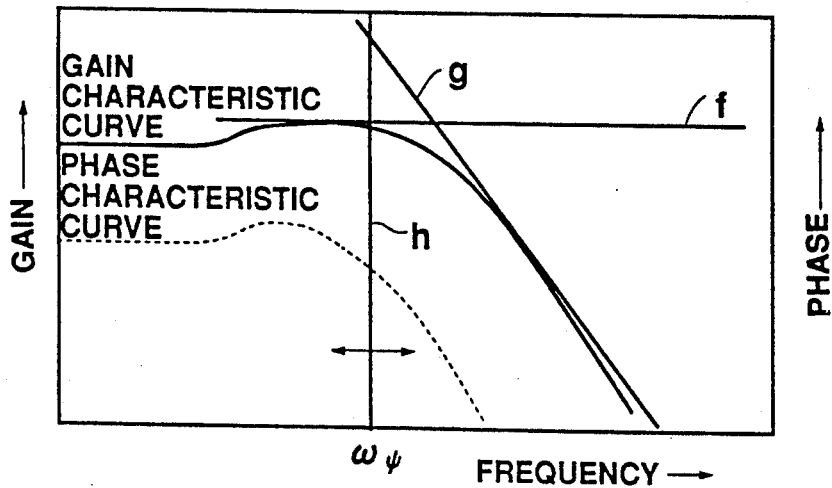

After that, a straight line g inclined by $-40$ dB/dec is displayed with the frequency response curves as shown in FIG. 11. The straight line g can be moved vertically by manipulating the mouse. The straight line g is adjusted to a proper position relative to the gain characteristic curve, and the button of the mouse is clicked to read an intersection frequency $\omega_c$ [rad/sec] and a gain $|G(j\omega_c)|$ at the moment. Then, the transfer function parameter deciding portion 14 decides the parameters and as follows:

$$\omega = \omega_c \quad (19)$$

$$\xi = K/(2G(j\omega_c)) \quad (20)$$

After that, a vertical straight line h representing a certain frequency $\omega_\psi$ is displayed. The straight line h can be moved left and right by manipulating the mouse. The straight line h is adjusted to a desired frequency on the phase characteristic curve, and the button of the mouse is clicked to read the frequency $\omega_\psi$ and a phase $<G(j\omega_\psi)$ [rad/sec] at the moment. Then, the transfer function parameter deciding portion 14 decides the parameter L of the equation (6) as follows:

$$L = \{\{-<G(j\omega_\psi) - \tan^{-1}[2\xi(\omega_\psi/\omega)/(1-(\omega_\psi/\omega)^2)]\}\}/(\omega_\psi) \text{ (if } L<0 \text{ then } L=0) \quad (21)$$

Through these processes, the transfer function converting portion 4 can decide the low degree transfer function of type I, II, or III expressed with the equation (4), (5) or (6). A frequency response curve of the low degree transfer function thus decided and the original frequency response curves are both displayed on the screen of the CRT 15 so that the operator can evaluate their degree of approximation and repeatedly operate the transfer function converting portion 4 until a desired low degree transfer function is obtained.

The control constant deciding portion 5 uses the low degree transfer function of any of the equations (4) to (6) obtained by the transfer function converting portion 4 to calculate control parameter (a proportional gain KP, an integral time TI and a derivative time TD) of a PID control system according to any one of the Ziegler-Nichols method, CHR method and partial model matching method.

If the Ziegler-Nichols method is selected, the contral parameter are decided from the parameters of the low degree transfer function of type I or II as follows:

$$\begin{aligned} KP &= 1.2/KL \text{ (for type I)} \\ &= 1.2T/KL \text{ (for type II)} \\ TI &= 2L \\ TD &= 0.5L \end{aligned} \quad (22)$$

If the CHR method is selected, the contral parameters are decided from the parameters of the low degree transfer function of type II as follows:

$$KP = 0.95T/KL$$

$$TI = 2.4L$$

$$TD = 0.4L \quad (23)$$

If the partial model matching method is selected, the transfer function of type I, II or III is converted into the following form:

$$G(S) = 1/(g_0 = g_1 S + g_2 S^2 + \ldots) \quad (24)$$

For example, for the type I, the conversion will be as follows:

$$g_0 = 0$$

$$g_1 = 1/k$$

$$g_2 = L/K$$

$$g_3 = L^2/(2K) \quad (25)$$

For the type II, the conversion will be as follows:

$$g_0 = 1/K$$

$$g_1 = (L+T)/K$$

$$g_2 = (L^2/2 + TL)/K$$

$$g_3 = (L^3/6 + TL^2/2)/K \quad (26)$$

For the type III, the conversion will be as follows:

$$g_0 = 1/k$$

$$g_1 = (L + 2\zeta/\omega)/K$$

$$g_2 = (L^2/2 + TL)/K$$

$$g_3 = (L^3/6 + TL^2/2)/K \quad (27)$$

Supposing $$\alpha_2 = 0.5$$

$$\alpha_3 = 0.15$$

$$\alpha_4 = 0.03 \quad (28)$$

and $$\sigma = (g_3 a_3)/(g_2 a_4)$$

$$k = g_2/(a_3 \sigma^3)$$

$$f_1 = k a_2 \sigma^2 - g_1$$

$$f_0 = k\sigma - g_0 \tag{29}$$

then the control parameters are decided as follows:
$$KP = f_0$$

$$TI = f_0/k$$

$$TD = f_1/f_0 \tag{30}$$

The partial model matching method can be employed in a decoupling control system for a multivariate process or in a digital control system. In this case, the similar processes are carried out to find a low degree transfer function model for each element of dynamic characteristic model (for example, a pulse transfer function matrix) of multiple-input-output process. The low degree transfer function model is converted into the form of equation (24) to obtain control parameters according to a corresponding method (for example, Y. Mori and T. Shigemasa, T. Kitamori: "A design method for sampled data decoupled control systems with multirate sampling periods," IFAC 7th conference on digital computer applications to process control, pp. 671 (1985)).

The embodiment of the control system of the present invention explained in the above is provided with the transfer function estimating portion 10 and frequency response curve estimating portion 11 to convert the dynamic characteristics of the object 1 that may take a form of pulse transfer function, high degree continuous-time transfer function or frequency response curve, into a transfer function of specific form.

In addition, the embodiment of the present invention employs the Ziegler-Nichols method, CHR method and partial model matching method to easily determine the control parameters of the control system such as a PID control system for the object 1 with any frequency response characteristic.

Further, the embodiment of the present invention allows an operator to watch the frequency characteristic curve of the object 1 to approximate simple linear diagrams to an appropriate frequency band of the frequency characteristic curve. Therefore, a low degree transfer function that accurately approximates to characteristics of the cut off frequency band of the controlled object which is very important in the control system for the object 1, is obtainable. In this way, the control system of the present invention can increase its an applicable range for various objects to be controlled.

Particularly when the object 1 involves a complicated frequency characteristic curve, the invention can select an important frequency band on the curve according to characteristics of the object 1 in performing approximation of the frequency characteristic curve. As a result, a desired transfer function is obtainable.

The control system of the present invention uses the CAD 3 equipped with the CRT 15 and the mouse to fit the approximate curves a, b, c, etc., of a model transfer function to an original frequency response curve. Therefore, the fitting work is carried out visually and easily to complete the work correctly and quickly.

The approximate curves are adjusted to desired positions in an cut-off frequency band of the original frequency response curve as shown in FIG. 2 to obtain a low degree transfer function that accurately approximates to the characteristics of the cut-off frequency band of the object 1. The cut-off frequency band of the object 1 is very important in stabilizing the control system.

Figure 13:
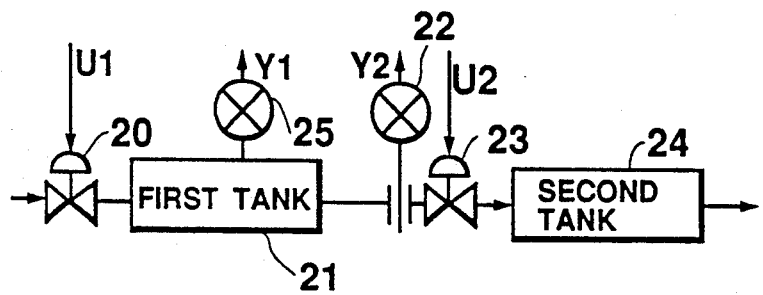
FIG. 13 is a block diagram of a plant to which the present invention is applied.

FIG. 13 is a beach diagram of an example of the control system of the present invention for controlling flow rates and pressures of fluid in a process which is the object 1 to be controlled.

As shown in the figure, the control system feeds fluid to a first tank 21 through a pressure control valve 20, and feeds the fluid in the first tank 21 to a second tank 24 via a flow meter 22 and a flow adjusting valve 23. The first tank 21 is equipped with a pressure gauge 25.

The pressure control valve 20 and flow control valve 23 receive manipulating variables U1 and U2, respectively. The pressure gauge 25 and flow meter 22 provide variable Y1 and Y2 to be controlled, respectively.

Figure 14:
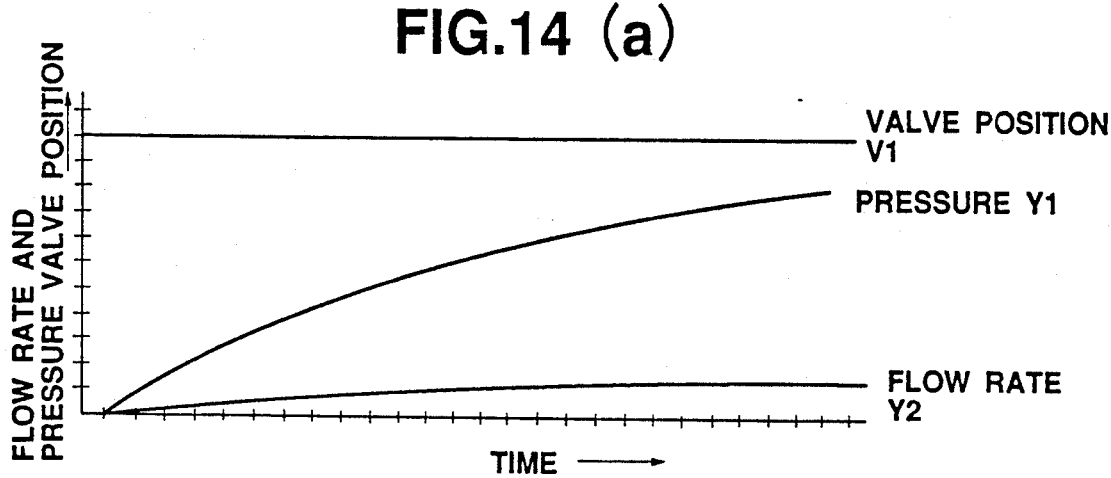
FIGS. 14(a) and 14(b) are views showing open loop response curves of flow rates and pressures of the plant shown in FIG. 13.
Figure 14:
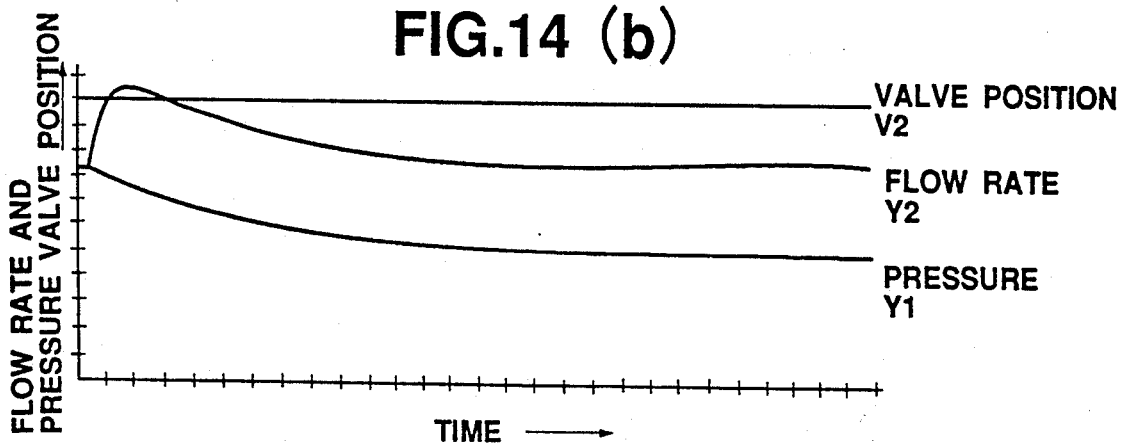

FIGS. 14(a) and 14(b) show pressure and flow rate response curve with respect to stepwise changes of the pressure control valve 20 and flow control valve 23. The figures show that the process demonstrates strong inter connection between the detected flow rate Y2 and the detected pressure Y1.

In the process of FIG. 13, the signal U1 representing an opening amount of the pressure control valve 20 and the pressure signal Y1 of the same valve 20 are measured. Then, the pulse transfer function estimating portion 9 finds a pulse transfer function $G_{11}(Z^{-1})$ according to the least square method. The frequency response curve estimating portion 11 finds a frequency response curve. The frequency response curve and an approximate curve of a selected model transfer function of, for example, type II corresponding to the frequency response curve are displayed on the screen of the CRT 15 under the control of the frequency response curve display controlling portion 12, as shown in FIGS. 14(a) and 14(b).

The mouse connected to the keyboard 16 of FIG. 3 is manipulated to decide positions of straight lines c, d and e. Then, the transfer function parameter deciding portion 14 decides the model transfer function of type II as follows:

$$G_{11}(S) = (2.7826)/(1+28.91S)/e^{-1.138S} \tag{31}$$

Figure 15:
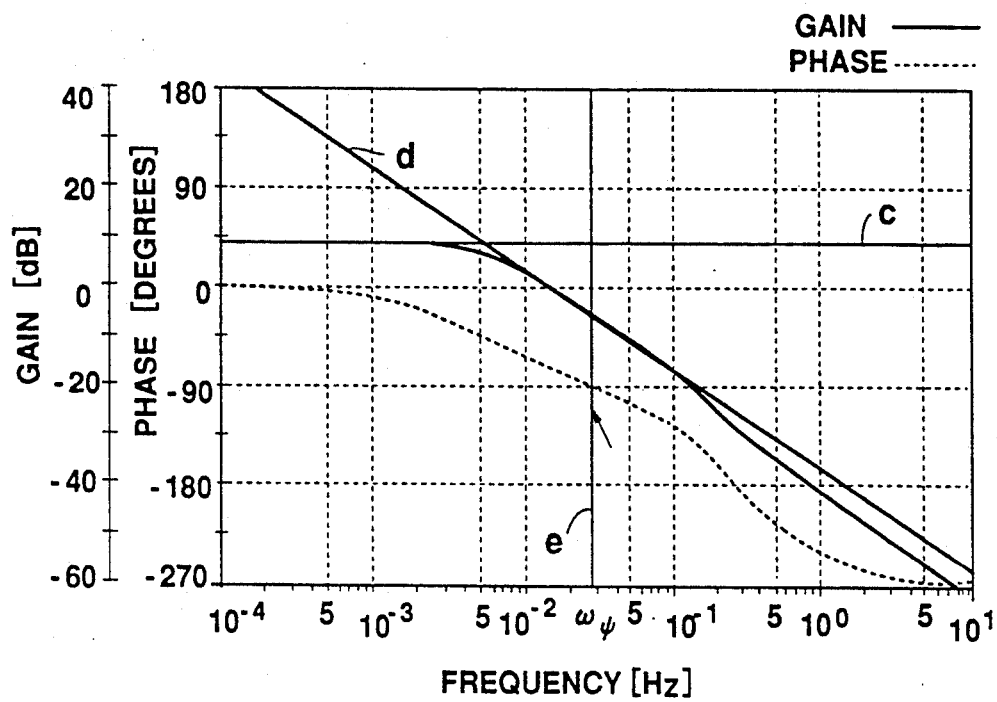
FIGS. 15(a) and 15(b) are explanatory views showing frequency response curves of the plant of FIG. 13 displayed on a screen of a CRT terminal.
Figure 15:
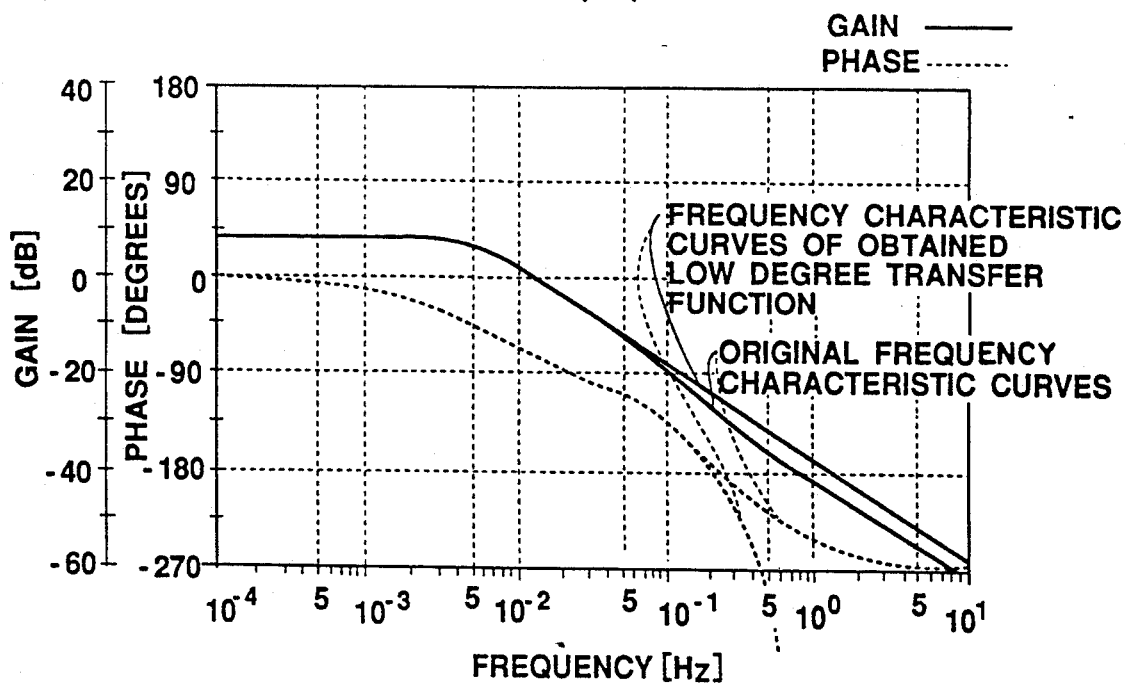

FIG. 15(b) shows the original frequency response curve and a frequency response curve calculated from the obtained transfer function $G_{11}(S)$. It is apparent that low and intermediate frequency bands of them are well matching with each other. FIG. 16 shows stepwise responses of the original pulse transfer function $G_{11}(Z^{-1})$ and the obtained transfer function $G_{11}(S)$. They are substantially matching with each other. Namely, the obtained low degree transfer function correctly preserves the characteristics of the original process.

The CHR method is applied to the equation (31) so as to find PID control parameter. FIG. 17 shows responses (with set point variables changing) in pressure control for determining the PID control parameters. It is clear in the figure that a stable and excellent control performance is realized with less overshooting.

With the same sequences as those mentioned in the above, pressure and flow rate characteristics of the valves 20 and 23 are estimated as a transfer function matrix of two-input two-output system, and the partial model matching method is employed in the control system. Pursuing responses of pressure and flow rate, set-point variables of the control system are shown in FIGS. 18(a) and 18(b). As shown in the figures, the flow rates fluctuate only a little when the pressures vary, and the pressures fluctuate only a little when the flow rates vary, because internal interference is suppressed by the decoupling PID control system. In each case, a good control performance is achieved.

In the control system of the present invention, approximate curves representing a model of low degree transfer function have been the straight lines a, b, c, etc. These straight lines may be substituted by curves to provide the same effect. Alternatively, straight lines and arcs may be combined. Namely, any line is acceptable if if can approximate the cut-off frequency band of an inputted frequency response curve as shown in FIG. 2.

The control system of the present invention has employed three models of low degree transfer functions and three control constant deciding methods. However, the control system of the present invention is not limited by them but may employ various models and control parameters deciding algorithms.

The control system of the present invention has employed the CAD 3 to move a model with respect to an original frequency response curve. Alternatively, fitting conditions with respect to the original curve may be set such that the model contacts with the original curve or such that an evaluation function related to an error is minimized. Then, the model is moved on a computer to realize a full automatic operation.

In this way, the objects of the present invention can be achieved in various forms without departing from the spirit of the invention.

In summary, the control system present of the invention finds a model of a desired transfer function based on dynamic characteristic data of object, and uses a desired control constant deciding algorithm to determine the control parameters of the control system for controlling the object. The control system of the present invention is able to control the objects having various characteristics.

Various modifications will become possible for those skilled in the art after receiving the teachings of the present disclosure without departing from the scope thereof.

What is claimed is:

1. A control system of an object to be controlled in a plant comprising:
   (a) frequency response curve forming means for forming an original frequency response curve of the object according to the dynamic characteristic data thereof;
   (b) model selecting means for selecting one of transfer function models, the transfer function models being low degree transfer functions prepared in advance to the original frequency response curve of the object;
   (c) approximate curve moving means for moving an approximate curve which corresponds to a frequency response curve representing the one of the transfer function models, toward and away from the original frequency response curve and for fitting to the original frequency response curve;
   (d) parameter deciding means for deciding parameters of the selected model transfer function according to the fixed position of the approximate curve fitted to the original frequency response curve;
   (e) control parameter deciding algorithm selecting means for selecting one of control parameter deciding algorithms prepared in advance; and
   (f) control parameter deciding means for deciding the control parameters based on the selected transfer function model whose parameters have been decided.

2. The control system as claimed in claim 1, wherein the dynamic characteristic data of the object to be controlled is at least one of continuous-time transfer function, pulse transfer function, frequency response data and input/output signal data of the object.

3. The control system as claimed in claim 1, wherein said approximate curve moving means comprises a computer having a display screen for displaying the original frequency response curve as well as the approximate curve and a mouse for moving the approximate curve toward and away from to fit to the original frequency response curve on the display screen.

4. The control system as claimed in claim 2, wherein the model transfer functions are $G_1(S)$, $G_2(S)$ expressed with the following equations:

$$G_1(S) = (K/L)e^{-LS}$$

$$G_2(S) = (K/(1+TS))e^{-LS}$$

$$G_3(S) = (K/(1+2\xi S\omega + S^2\omega^2))e^{-LS}$$

where S is a Laplace operator, K a gain, L a dead time, T a time constant and $\xi$ and $\omega$ parameters related to a second degree system.

5. The control system as claimed in claim 2, wherein the control parameters deciding algorithms are Ziegler-Nichols method, CHR method and partial model matching method, one of which algorithms is selected to calculate control parameters of one of PID (proportional integral derivative) control and a decoupling PID control.

6. The control system as claimed in claim 2, wherein the approximate curve is formed by combining a straight line horizontal to a frequency axis, a straight line vertical to the horizontal straight line and a straight line inclined by one of −20 dB and −40 dB to the horizontal straight line.

7. A method for obtaining control parameters of an object to be controlled according to dynamic characteristic data thereof comprising the steps of:
   (a) forming an original frequency response curve of the object to be controlled according to the dynamic characteristic data of the object, the dynamic characteristic data being one of continuous-time transfer function, pulse transfer function, frequency response data and input/output signal data of the object;
   (b) selecting one of transfer function models, the models being low degree transfer functions prepared in advance to express an original frequency response curve of the object;
   (c) moving an approximate curve which corresponds to a frequency response curve representing the selected transfer function model, toward and away in order to fit the original frequency response curve and fixing a position of the approximate curve;
   (d) deciding parameters of the selected model transfer function according to the fixed position of the approximate curve;

(e) selecting one of control parameters deciding algorithms prepared in advance; and
(f) deciding the control parameters based on the selected model transfer function whose parameters have been decided and according to the selected control parameters deciding algorithm.

8. The method as claimed in claim 7, wherein the model transfer functions are $G_1(S)$, $G_2(S)$ and $G_3(S)$ expressed with the following equations:

$$G_1(S) = (K/L)e^{-LS}$$

$$G_2(S) = (K/(1+TS))e^{-LS}$$

$$G_3(S) = (K/(1+2\xi S\omega + S^2\omega^2))e^{-LS}$$

where S is a Laplace operator, K a gain, L a dead time, T a time constant and $\xi$ and $\omega$ parameters related to a second order system.

9. The method as claimed in claim 7, wherein the control parameters deciding algorithms are Ziegler-Nichols method, CHR method and partial model matching method, one of the algorithms being selected to calculate control parameters of one of PID (proportional integral derivative) control and a decoupling PID control.

10. The method as claimed in claim 7, wherein the approximate curve is formed by combining a straight line horizontal to a frequency axis, a straight line vertical to the horizontal straight line and a straight line inclined by one of $-20$ dB and $-40$ dB to the horizontal straight line.

* * * * *